United States Patent [19]
Kanno et al.

[11] Patent Number: 5,551,477
[45] Date of Patent: Sep. 3, 1996

[54] DIAPHRAGM-TYPE FLOW CONTROL VALVE AND MANUAL CONTROL VALVE APPARATUS

[75] Inventors: Yohichi Kanno; Osamu Uchisawa; Sigekazu Yamazaki, all of Sendai, Japan

[73] Assignee: Kabushiki-Kaisha Motoyama Seisakusho, Miyagi-ken, Japan

[21] Appl. No.: 273,052

[22] Filed: Jul. 8, 1994

[51] Int. Cl.[6] .......................... F16K 37/00; F16K 31/524; F16K 1/32
[52] U.S. Cl. .......................... 137/553; 251/256; 251/263; 251/297; 251/331
[58] Field of Search .......................... 137/553, 556; 251/256, 263, 297, 331

[56] References Cited

U.S. PATENT DOCUMENTS

| | | | |
|---|---|---|---|
| 900,598 | 10/1908 | Schuermann | 251/256 X |
| 1,526,921 | 2/1925 | McNamara | 251/256 X |
| 1,529,222 | 3/1925 | Spence | 251/256 X |
| 1,722,401 | 7/1929 | Todd | 251/256 X |
| 2,201,095 | 5/1940 | Kaufman | 251/256 X |
| 2,669,418 | 2/1954 | Brumbaugh | 137/556 X |
| 3,363,878 | 1/1968 | Smith et al. | 251/263 X |
| 3,910,308 | 10/1975 | Mack | 137/553 |
| 4,477,054 | 10/1984 | Dauby et al. | 251/256 X |
| 5,108,069 | 4/1992 | Tada et al. | 251/331 X |

FOREIGN PATENT DOCUMENTS

| | | | |
|---|---|---|---|
| 451600 | 9/1949 | Italy | 251/256 |

*Primary Examiner*—John Rivell
*Attorney, Agent, or Firm*—Baker & Daniels

[57] ABSTRACT

A manual control valve apparatus having a structure which is provided with, as a conversion mechanism, a diaphragm compressor which is held between a valve casing and a guide member, arcuate engaging grooves formed in a surface of the diaphragm presser opposite to the valve stem, and rolling elements which engage in a freely rolling manner in the engaging grooves and are supported by the lead end part of the valve stem. The bottom surfaces of the engaging grooves are made cam surfaces for causing reciprocating motion in the axial direction of the valve stem. An indicator possessing opening indicating portions indicating the rotational position of the valve stem is attached to the opposite end of the guide member from the valve casing, and furthermore, windows exposing the opening support portions are provided in an area from the circumferential wall of the handle to the end wall thereof. Using this structure, it is possible to compactly incorporate an indicator indicating a degree of valve opening around the handle. Furthermore, the structure of the conversion mechanism is simplified and can be miniaturized, so that it is possible to incorporate the conversion mechanism within the guide member.

1 Claim, 8 Drawing Sheets

FIG. 1

FIG_2

FIG_7

FIG_8

FIG_9

FIG_10

FIG. 11

DIAPHRAGM-TYPE FLOW CONTROL VALVE AND MANUAL CONTROL VALVE APPARATUS

TECHNICAL FIELD

The present invention relates to a diaphragm-type flow control valve, which is used in gas flow control in gas piping systems for ultra-pure gas which is used, for example, in semiconductor device manufacturing and the like, as well as to a manual valve apparatus which is provided with a valve stem which is manually rotated, and in particular, relates to the structure of a conversion mechanism which converts the rotation of this valve stem to reciprocating motion in the axial direction and transmits this to the valve.

BACKGROUND ART

Conventionally, among flow control valves such as those described above, bellows seal types and diaphragm types are known. The former, the bellows seal-type flow control valves, have a composition in which the gas flow rate is controlled by means of controlling the size of a gap between a valve aperture and a needle-shaped valve which is operated in accordance with the operation of a bellows. For this reason, the problem of contamination occurs as a result of the microparticles generated as a result of the friction between the needle-shaped valve and the inner walls. Furthermore, the degree of mechanical precision between the component elements, such as the valve aperture and the valve, exert a direct influence on the accuracy of gas flow rate control. As a result, in order to restrict undesirable variation in gas flow rate control, it is necessary to maintain an extremely high degree of accuracy in the machining of the component elements described above, and there is a problem in that productivity declines. Accordingly, in, for example, the case in which a highly pure special gas for semiconductor device manufacturing is handled, such a valve is inappropriate for use.

Furthermore, a conventional diaphragm-type flow control valve was disclosed in, for example, Japanese Utility Model Application, First Publication, No. Hei 1-128078. This diaphragm-type flow control valve was provided with a drive unit comprising a combination of a rack and pinion mechanism and an eccentric cam mechanism; as a result of the motion of the above-described rack, the above-described eccentric cam was caused to rotate, and furthermore, this rotation was transmitted to a diaphragm via operational elements such as upper and lower stems and the like, and the diaphragm was caused to move.

However, in the conventional diaphragm-type flow control valve described above, the composition of the drive unit included primarily the two mechanisms, the rack and pinion mechanism and the eccentric cam mechanism, described above. Furthermore, between these two mechanisms and the diaphragm, operational elements such as a lower stem, which moved in accordance with the diaphragm, or an upper stem, which was an element driven by the eccentric cam, or the like, were disposed. For this reason, the number of parts increased, and the production costs could not be reduced below a certain level. Furthermore, it was necessary to concomitantly provide both of the mechanisms described above in the drive unit which was coupled to the main unit. For this reason, the outward appearance was unavoidably poor, having an irregular shape. Moreover, there is a limit to the miniaturization of these two mechanisms, as a result of manufacturing technology which is based on constraints in the present material development technology, and there is thus a limit to the miniaturization of the apparatus as a whole.

On the other hand, the manually operated metal diaphragm valve which is used, for example, in a semiconductor manufacturing line or a refining line for ultra-pure fluid having an impurity concentration of 1 ppb or less, is provided with a handle for the purpose of manual rotation. This handle is coupled to the valve stem and rotates together with this valve stem. Furthermore, this valve stem is supported by a bonnet, which is connected to the valve casing, so as to be capable of reciprocating motion in the axial direction thereof, and so as to be capable of rotation about the axis thereof.

In the metal diaphragm valve described above, the rotational torque which is applied to the handle described above is converted into a thrust force along the axial direction of the valve stem, and by means of this, the diaphragm, which is linked to this valve stem, is pressed into the valve seat, and thereby, the desired cut-off force is obtained.

However, in this conventional metal diaphragm valve, the operational force placed on the handle by a human being is transmitted in an unchanged manner to the valve seat via the valve stem, so that there are cases in which excessive cut-off force is generated. Accordingly, an excessive compressive force is applied to the valve seat or the diaphragm, and as a result, there are occurrences of the deformation or damage of the valve seat or diaphragm, and as a result, there are cases in which the service life of the metal diaphragm valve is shortened.

Figure 11:
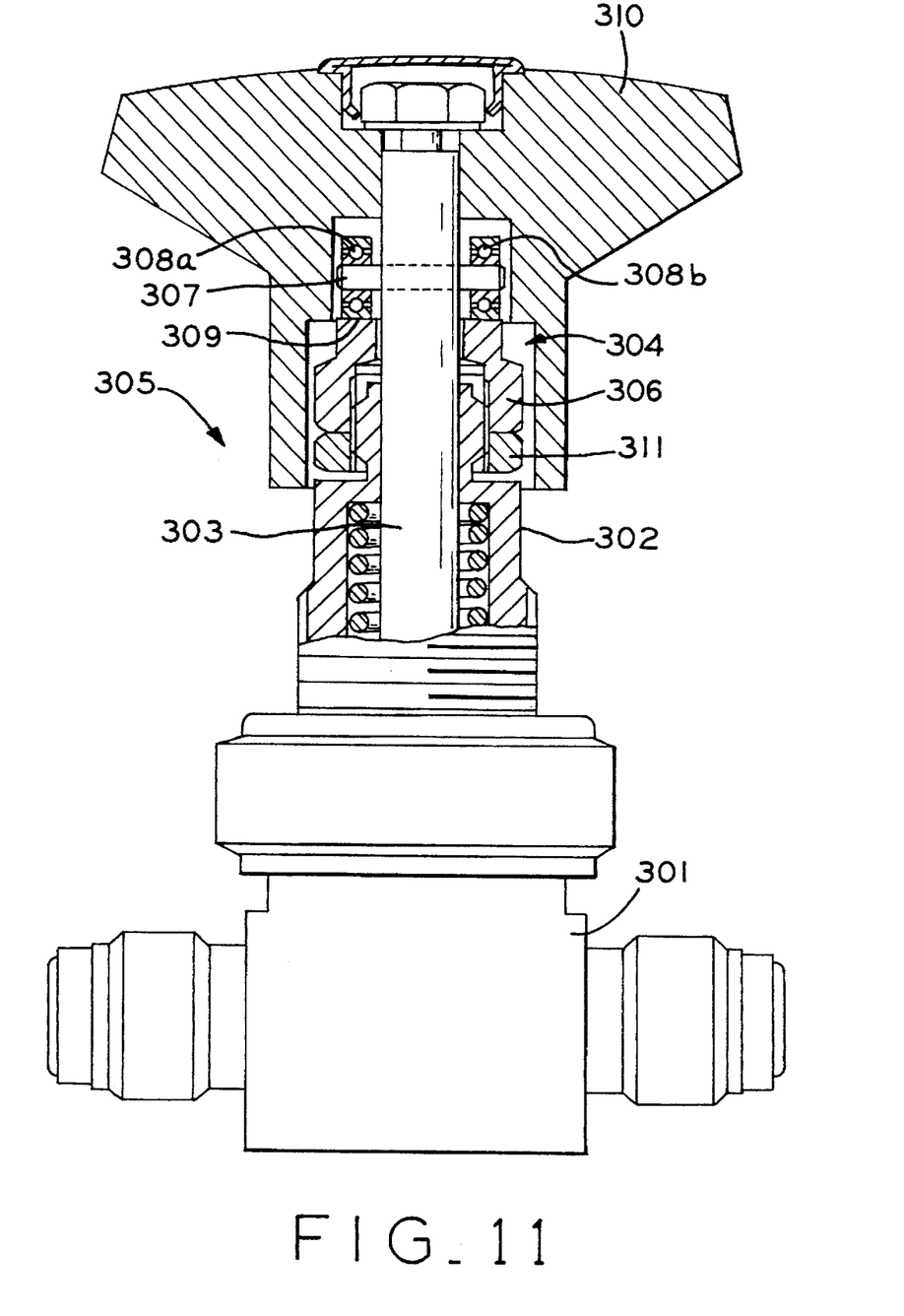
FIG. 11 is a cross sectional view of a conventional manual diaphragm valve.

A diaphragm valve 305 in which, as shown in FIG. 11, a conversion mechanism 304 for converting the rotation of a valve stem 303 into reciprocating motion in the axial direction was provided at the upper end portion of a bonnet 302 connected to the valve casing 301, was conventionally known as a metal diaphragm valve which was used in order to solve these types of problems. This conversion mechanism 304 is provided with a cylindrical cam member 306 which is attached to the outer circumference of the upper end portion of bonnet 302, a pin 307 which is affixed to the end of valve stem 303 projecting from bonnet 302, and a pair of ball bearings 308a and 308b which are attached to both ends of this pin 307. Furthermore, pin 307 penetrates valve stem 303 in a diametrical direction, and rotates together with this valve stem 303; the ball bearings 308a and 308b which are at both ends of this pin 307 have a structure in which they are in contact with the cam surface 309 at the upper end surface of cam member 306 while rolling thereon.

In the diaphragm valve 305 shown in FIG. 11, when an operator rotates valve stem 303 via handle 310, ball bearings 308a and 308b move along cam surface 309 in accordance with this, and by means of this motion, the valve stem 303 moves reciprocally in the axial direction thereof in accordance with the shape of the cam surface 309. Here, the stroke amount and lift characteristics of valve stem 303 are determined in accordance with the shape of cam surface 309.

However, the conversion mechanism 304 described above is attached to the upper end portion of bonnet 302, which is separated by a considerable distance from the valve seat within valve casing 301, so that in cases in which the lift amount of the valve stem 303 is small with respect to the rotational angle of handle 310, as is the case with a diaphragm valve 105 having a small diameter, there are cases in which undesirable variation is produced in the lift characteristics of the valve stem 303 as a result of the position at which cam member 306 is attached. For this reason, by adopting a configuration in which cam member 306 can be freely moved in the axial direction so as to screw onto the outer circumferential surface of the upper end portion of bonnet 302, the positioning and fastening of cam member 306 is conducted by means of a dedicated lock nut 311 which is screwed onto the outer circumferential surface of the upper end portion of bonnet 302.

Accordingly, in the diaphragm valve 305 containing this conventional conversion mechanism 304, cam member 306 and ball bearings 308*a* and 308*b* are present at the end portion of bonnet 302 on the side of handle 310. For this reason, this end portion of bonnet 302 has a disproportionately large shape in comparison with the valve casing 301 side.

Furthermore, in recent manually-operated metal diaphragm valves, it has come to be seen as important that an indicator which displays the degree of opening of the valve be provided. Indicators are known, for example, in which the degree of opening of the valve is indicated on the upper surface of the handle, and indicators in which the handle has a shape which is non-symmetrical with respect to the valve stem, and the degree of opening of the valve is determined from the position of the handle, and the like, are known. Here, indicators which operate according to the method in which the degree of opening of the valve is determined from the position of the handle are of no use in, for example, valve apparatuses which are provided with a plurality of connecting ports, such as in 3-way valves, or in valve apparatuses having complex shapes, such as block valves. Accordingly, in order to display the degree of opening of the valve irrespective of the type of valve apparatus, it is advantageous to employ a method in which an indicator is incorporated in the handle.

However, when an indicator is incorporated into a diaphragm valve 305 containing a conversion mechanism 304 such as that described above, a large conversion mechanism 304 is present in the diaphragm valve 305 at the end of the bonnet 302 which is on the side of handle 310. Accordingly, it is impossible to provide the space necessary to incorporate the indicator around handle 310. For this reason, the method in which the handle 310 has a shape which is non-symmetrical with respect to valve stem 303 must be adopted for the display of the degree of opening of the valve. Accordingly, depending on the type of valve, it is sometimes impossible to determine the degree of opening of the valve. Moreover, the conventional conversion mechanism 304 which is described above requires ball bearings 308*a* and 308*b*, which project outwardly in the diametrical direction from valve stem 303. For this reason, when a miniaturization of the entire valve apparatus is required, these ball bearings 308*a* and 308*b* present difficulties, and the incorporation of the conversion mechanism 304 becomes effectively impossible.

It is an object of the present invention to provide a diaphragm-type flow control valve which enables a simplification and miniaturization of the composition of the entire mechanism, and which allows for a reduction in manufacturing costs.

It is a further object of the present invention to provide a manual valve apparatus which is capable of easily and compactly incorporating an indicator displaying the degree of opening of the valve around the handle, even when a conversion mechanism which converts the rotation of the handle to reciprocal motion is provided, and moreover, which achieves a simple and miniaturized structure of this conversion mechanism and allows for the placement thereof within a guide member.

It is a further object of the present invention to provide a manual valve apparatus which enables a confirmation of the completion of the opening or closing operation of the valve not merely visually, but also by means of a sound or a vibration transmitted to the handle, so that by means of this, the opening and closing operation of the valve can be more reliably conducted, and which prevents undesired rotation of the valve stem or the handle even during use under conditions in which vibration is transmitted to the valve stem.

DISCLOSURE OF THE INVENTION

In order to solve the problems described above, the present invention provides a diaphragm-type flow control valve in which a lower stem and an upper stem are coaxially provided within a cylindrical bonnet, a first male screw portion which is formed on the lower stem is screwably engaged with a first female screw portion which is formed on the upper stem, a second male screw portion which is formed on the cylindrical bonnet is screwably engaged with a second female screw portion which is formed in the handle which is fastened to the upper stem, and furthermore, by means of moving the lower stem in the axial direction as a result of the rotation of the handle, the diaphragm valve which is positioned at the end of the lower stem in the axial direction is opened and closed.

In the diaphragm-type flow control valve in accordance with the present invention, when the handle is rotated in one direction, the upper stem rotates in accordance with this, and furthermore, in accordance with the rotation of the upper stem, the lower stem, which is prevented from rotating by the bonnet, is moved in the axial direction. In addition, one end of the lower stem in the axial direction thereof is in contact with the diaphragm, so that in accordance with the movement in the axial direction of the lower stem, the degree of opening of the valve aperture can be controlled by means of the diaphragm. Here, the screw pitch of the two screw portions, the first male and female screw portions, and the second male and female screw portions, is set so as to be identical, insofar as possible, and thereby, the amount of motion of the lower stem in response to the amount of rotation of the handle can be made moderate, and by means of this, it is possible to reduce the operational sensitivity.

Furthermore, in order to solve the problems described above, the present invention provides a manual valve apparatus which is provided with: a valve casing having a valve seat; a cylindrical guide member which is coupled with the valve casing; a valve stem, which is supported by the guide member so as to be capable of reciprocating motion in a direction of contact with or separation from the valve seat, is further supported so as to be capable of rotation about the axis thereof, and has an end on the opposite side from the valve casing which projects outwardly from the guide member; a valve, which is interposed between the valve stem and the valve seat, and is placed in contact with or separated from the valve seat via the valve stem; a spring member which urges in a direction such that the valve is constantly pressed in the direction of the valve seat; and a handle, which is coupled with the end of the valve stem projecting outwardly, and which serves to bring the valve into contact with the valve seat or separate the valve from the valve seat by means of causing the rotation of the valve stem.

Here, it is also possible to interpose a conversion mechanism, which converts the rotation of the valve stem into reciprocating motion in the axial direction, between the valve casing and the guide member. This conversion mechanism is provided with a base possessing an opposing surface which is opposite to the lead end surface of the valve stem, engaging grooves which are formed in the opposing surface of the base and are formed with an arcuate shape centering on the axial line of the valve stem, and rolling elements which are supported by the lead end surface of the valve stem and are engaged in a freely rotatable manner in the engaging grooves. By making the bottom surface of the engaging grooves inclined along the direction of the grooves, it is possible to provide cam surfaces for causing reciprocating motion in the axial direction of the valve stem along the bottom surface of the grooves.

Furthermore, it is also possible to attach an indicator, which is provided with an opening indicate portion indicating the rotational position of the valve stem, at the end of the guide member which is opposite from the valve casing, and adjoining the handle. In this case, the handle which adjoins the indicator is provided with a circumferential wall which covers the circumferential surface of the indicator, and an end wall which covers the opening indicate portion of the indicator and is connected to the circumferential wall; furthermore, a window is provided which exposes the opening support portion in a region from the circumferential wall to the end wall of the handle.

Furthermore, it is also possible to provide, in the bottom surface of the engaging grooves, cavities into which the rolling elements snap when the valve stem is rotated to the closed position or the opened position.

In the manual valve apparatus of the present invention, the conversion mechanism is interposed between the valve casing and the guide member, and is in the vicinity of the valve seat within the valve casing, so that it is possible to greatly restrict undesirable variation in the position thereof with respect to the valve seat. For this reason, a special structure for the positional adjustment of the conversion mechanism is unnecessary. Furthermore, the rolling elements for converting the rotation of the valve stem into reciprocating motion are supported by the lead end surface of the valve stem, so that there are no parts which project outwardly in the diametrical direction of the valve stem. For this reason, the conversion mechanism itself can be formed in a compact manner. As a result, the conversion mechanism can be contained within the guide member, and a miniaturization of the valve apparatus itself becomes possible.

Moreover, in the conversion mechanism, the rolling elements roll along the cam surfaces of the engaging grooves while maintaining contact therewith, so that the rotation of the handle is converted into reciprocating motion in the axial direction of the valve stem, and as a result, the lift characteristics or operational torque characteristics of the valve stem can be freely set simply by changing the shape of the cam surfaces.

Furthermore, as described above, the conversion mechanism is in the vicinity of the valve seat, so that the space at the handle end of the guide member is freed, and space sufficient for the installation of an indicator can be guaranteed. In addition, the opening display portion of this indicator is exposed in a window which is opened continuously from the end surface of the handle to the circumferential surface thereof, so that it is possible to view the opening display portion from a wide range of positions around the circumference of the handle, blind spots are eliminated in the display of the degree of the opening of the valve, and the ease of use is improved.

Furthermore, when the valve stem is rotated to the closed position or the opened position, the rolling elements receive the urging force of the spring and snap into the cavities in the bottom surface of the engaging grooves. As a result of this engagement, an engaging sound is produced when the rolling elements descend into the cavities, and furthermore, a shock is transmitted to the handle through the valve stem, so that a sense of standardization is provided in handle operations. For this reason, it is possible to recognize the point at which the valve stem has been moved to the closed position or the opened position, not merely visually, but also in an auditory and tactile manner. Accordingly, even when the indicator of the valve apparatus is obstructed by the piping, or this indicator has become darkened and difficult to read, it is possible to determine when the opening or closing of the valve has been completed.

Furthermore, when the valve stem is rotated from the closed position to the opened position, or is rotated in the opposite direction, it is necessary that the rolling elements ascend the stepped portion which is produced between the cavities and the bottom surfaces of the grooves, and accordingly, it is necessary to apply a large rotational torque to the handle at this time. Accordingly, even during use under conditions in which vibrations are applied to the valve apparatus, the valve stem or handle will not be rotated in an undesirable manner, and the valve stem can be reliably maintained in the closed position or in the opened position.

BRIEF EXPLANATION OF THE DRAWINGS

FIG. 6 shows the indicator in an embodiment of the manual valve apparatus in accordance with the present invention; (a) is a top view showing the display state of the indicator when the handle is rotated to the closed position, and (b) is a top view showing the display state of the indicator when the handle is rotated to the opened position.

BEST MODE FOR CARRYING OUT THE INVENTION

Figure 1:
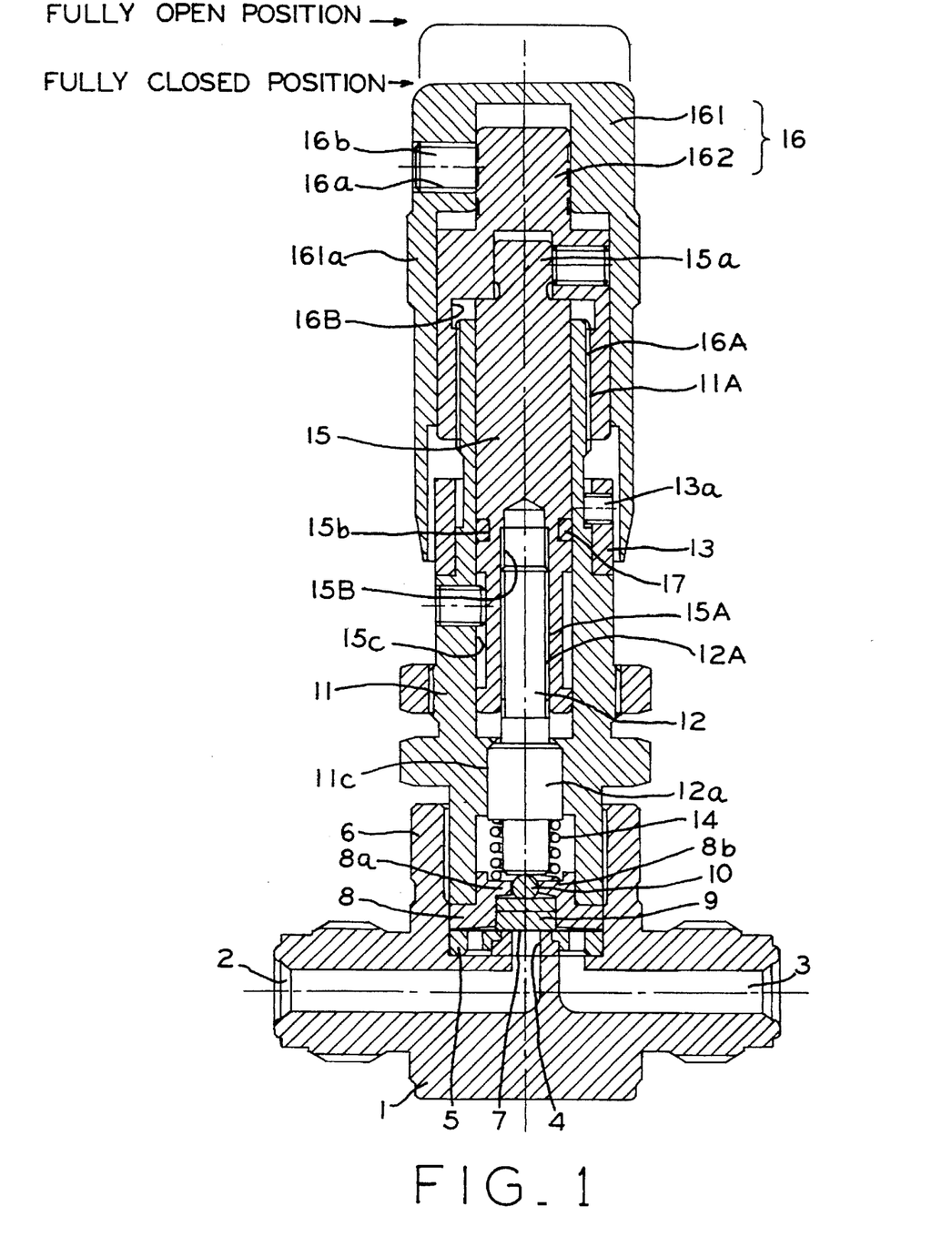
FIG. 1 shows the composition of an embodiment of the diaphragm-type flow control valve in accordance with the present invention; it is a vertical cross sectional view of the state in which the valve aperture is completely closed.

FIG. 1 shows an embodiment of a diaphragm-type flow control valve in accordance with the present invention. In FIG. 1, in a valve body 1 which is coupled to a gas piping system, a valve seat 5, in which a valve aperture 4 communicating with a flow inlet 2 and a flow outlet 3 is formed, is loaded. Furthermore, the valve body 1 is provided with a cylindrical valve chamber 6 having valve aperture 4 as a central position, and formed so as to rise from the vicinity of the valve head position of valve aperture 4.

A diaphragm 7 covering valve aperture 4 is provided within valve chamber 6. Furthermore, an actuator button holder 8 is provided; the peripheral part of diaphragm 7 is held between this actuator button holder 8 and the valve seat 5. An actuator button 9 is in contact with the uppermost surface of the diaphragm 7 on the side opposite from the valve aperture. A ball plate 10 which is welded by means of an appropriate means is provided above actuator button 9. Ball plate 10 faces into a guide hole 8b which is formed in the central part of the spring seat 8a formed in the upper portion of actuator button holder 8.

The lower end portion of a bonnet 11 having an approximately cylindrical shape is screwed into valve chamber 6 and thus affixed. The upper end of bonnet 11 projects above valve chamber 6. The circumferential portion of the actuator button holder 8 is held between the lower end portion of the bonnet 11 and the valve seat 5. Furthermore, a rod shaped lower stem 12 having an involute spline attached thereto is inserted into the lower portion of the bonnet 11, a first male screw portion 12A is formed on the upper portion of the involute spline 12a of the lower stem 12, and a coil spring 14 is provided in an urging manner between involute spline 12a and spring seat 8a. An involute spline 11c is formed in the surface of bonnet 11 corresponding to involute spline 12a; this involute spline 11c corresponds to involute spline 12a and engages in a suspended manner with involute spline 12a. Furthermore, the ball of ball plate 10 is in contact with the lower end of lower stem 12.

A rod-shaped upper stem 15 is inserted into the upper side of bonnet 11 so as to pass therethrough. A female screw hole 15B is formed below upper stem 15, and furthermore, a first female screw portion 15A is formed in female screw hole 15B. The first female screw portion 15A is screwably engaged with the first male screw portion 12A of lower stem 12. Furthermore, the upper end portion of upper stem 15 projects slightly above bonnet 11. A small diameter projecting portion 15a is formed in the upper end portion thereof.

A cylindrical cap-shaped handle 16 is provided at the upper end portion of bonnet 11 so as to cover the projecting upper stem 15. The handle 16 is provided with an inner handle 162 which is positioned in the inner side thereof, and a vernier handle 161 which is positioned at the outer side. A small diameter columnar portion is formed at the upper part of inner handle 162, and this small diameter columnar portion is engaged within the small diameter projecting portion 15a described above. The vernier handle 161 and the inner handle 162 are fastened by means of screwing the machine screw 16b into the screw hole 16a which is formed on the outer circumference of the vernier handle 161.

A vernier scale is formed in the vernier handle at the outer circumference of the lower end portion of the vernier handle 161. Furthermore, a gripping portion 161a comprising an annular projection, which is used when the operator grasps the vernier handle 161 with his fingers, is formed in the outer circumference of the central part of the vernier handle 161. A plurality of filaments extending in the axial direction, for example, are formed at a prespecified spacing in the circumferential direction in the gripping portion 161a.

Furthermore, an indicator collar 13 is formed in the central portion of the bonnet 11. This indicator collar 13 is affixed to the bonnet 11 by means of screwing the machine screw 13a into the screw hole formed in the outer circumference thereof. A regular scale corresponding to the vernier scale of vernier handle 161 described above is formed in the axial direction of the outer circumference of the indicator collar 13. Here, this regular scale indicates, for example, the number of rotations of handle 16, and furthermore, the vernier scale described above indicates, for example, one rotation of the handle 161 per 10 units.

A second male screw portion 11A is formed at the upper end portion of bonnet 11. The second male screw portion 11A screwably engages with the second female screw portion 16A which is formed in the female screw hole 16B of inner handle 162. First male screw portion 12A and first female screw portion 15A, and second male screw portion 11A and second female screw portion 16A possess a common axial direction Q, and have an identical direction of screw progression; in the present embodiment, they are set as right-handed screws, respectively. Furthermore, above female screw hole 15B of upper stem 15, an annular groove 15B is formed. An O-ring 17 forming an air-tight mechanism is installed in this annular groove 15b.

Furthermore, a wide annular groove 15c is formed below the annular groove 15b of upper stem 15. A semi-fastening screw hole 11a is formed at the portion of bonnet 11 opposite to this wide annular groove 15c, as a semifastening mechanism.

Furthermore, the screw pitch of the first male screw portion 12A and the first female screw portion 15A is, for example, 0.80. Furthermore, the screw pitch of the second male screw portion 11A and the second female screw portion 16A is, for example, 0.85. The control valve in accordance with the present embodiment, has, overall, a vertical columnar shape in which the various component parts are assembled along the axial direction Q.

Figure 2:
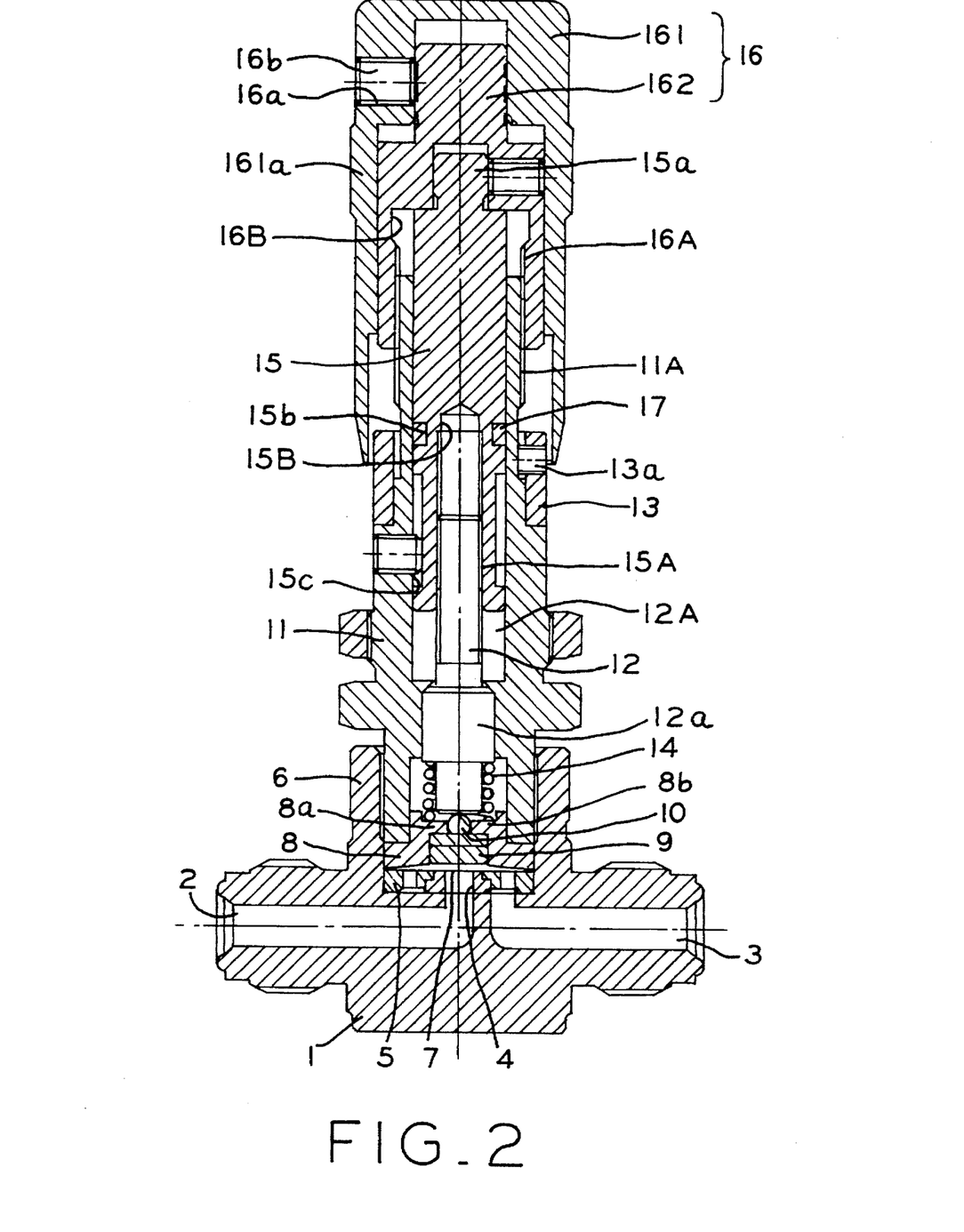
FIG. 2 is a vertical cross sectional view of the main parts in the diaphragm-type flow control valve in accordance with the present invention in the state in which the valve aperture is completely open.

Next, the operation of the present embodiment having the composition described above will be explained. FIG. 2 shows the state in which the valve aperture 4 is fully opened. In FIG. 2, when handle 16 is caused to rotate in the clockwise direction about axial direction Q of bonnet 11, the upper stem 15, which is integral with the handle 16, also rotates in a clockwise direction and is moved downward, while the second male screw portion 11A and the second female screw portion 16A are screwably engaged (that is to say, one rotation of the handle 16 moves the upper stem by an amount of screw progression of 0.85 mm).

When upper stem 15 is rotated, the rotation of the lower stem 12 within the bonnet 11 is prevented by the involute spline 12a, so that the first male screw portion 12A, which is screwably engaged with the first female screw portion 15A, proceeds into female screw hole 15B of upper stem 15 (that is to say, one revolution of upper stem 15 corresponds to an amount of screw progression of 0.80 mm). However, lower stem 12 moves downwardly against the spring force of coil spring 14. That is to say, the lower stem 12 moves downwardly by an amount equal to the difference between the two amounts of screw progression described above (0.85−0.80=0.05), in correspondence to one rotation of handle 16, and the upper surface of diaphragm 7 moves by this amount in the direction of valve closure.

Furthermore, diaphragm 7 is in contact with the lower end surface of lower stem 12 via ball plate 10 and actuator button 9. Accordingly, diaphragm 7 is pressed as a result of the downward movement of lower stem 12, and as a result, the degree of opening of aperture 4 can be reduced. When the desired degree of valve opening is established, the machine screw which is inserted into semi-fastening screw hole 11a is rotated, and upper stem 15 and bonnet 11 are fastened. That is to say, after fastening is conducted, the degree of opening of valve aperture 4 is constant, and accordingly, the gas flow rate through the valve aperture 4 is constant.

In the present embodiment, the difference in the amount of screw progression was set at 0.05; however, if this is set so as to approach zero insofar as is possible, it is possible to set the amount of movement in the degree of valve opening with respect to the amount of the rotation of the handle, that is to say, the operational sensitivity, to an optimum value from the point of view of operation.

In addition, in the present embodiment a vernier scale was formed on the vernier handle 161, and furthermore, a regular scale was formed on indicator collar 13, so that by confirming the values of this regular scale or vernier scale, it is possible to accurately and easily ascertain the number of rotations of handle 16. In addition, since the number of rotations of handle 16 corresponds to the degree of opening of the valve described above, it is possible to set a desired degree of opening by means of adjusting the amount of operation of handle 16 utilizing the regular scale and vernier scale described above as a standard.

As described above, in accordance with the diaphragm-type flow control valve in accordance with the present invention, two screw portions comprising a drive unit and a operational unit were formed coaxially. For this reason, it is possible to unitarily assemble the drive unit corresponding to the rotation and the like of the handle and the operational unit corresponding to the movement of the lower stem in the axial direction, in a cylindrical form along the axial direction described above. For this reason, a simplification and miniaturization of the overall structure is possible. Furthermore, in accordance with the simplification of the overall structure, the assemblability is governed solely by the attachment accuracy of the screw portions. For this reason, mechanical precision among the various component parts is not strictly required. Accordingly, it is possible to restrict undesirable variation in the functions among products, and it is possible to realize a reduction in manufacturing costs.

Furthermore, if the screw pitch of the two groups of screw portions is set so as to be similar, insofar as is possible, the operational sensitivity can be reduced, and this is useful in the adjustment of the degree of opening of the valve. Furthermore, by adopting a composition in which the upper stem is attached to the bonnet via an airtight mechanism, the air-tightness is improved. In addition, if a composition is adopted in which a semi-fastening mechanism is provided in the upper stem with respect to the bonnet, this is advantageous during the setting of the degree of opening of the valve. In addition, if the handle is formed so as to have an overall cap shape, a further contribution to the simplification of the overall shape is possible, and furthermore, the handle is smooth to the touch, is easily used, and the outward appearance is improved.

Figure 3:
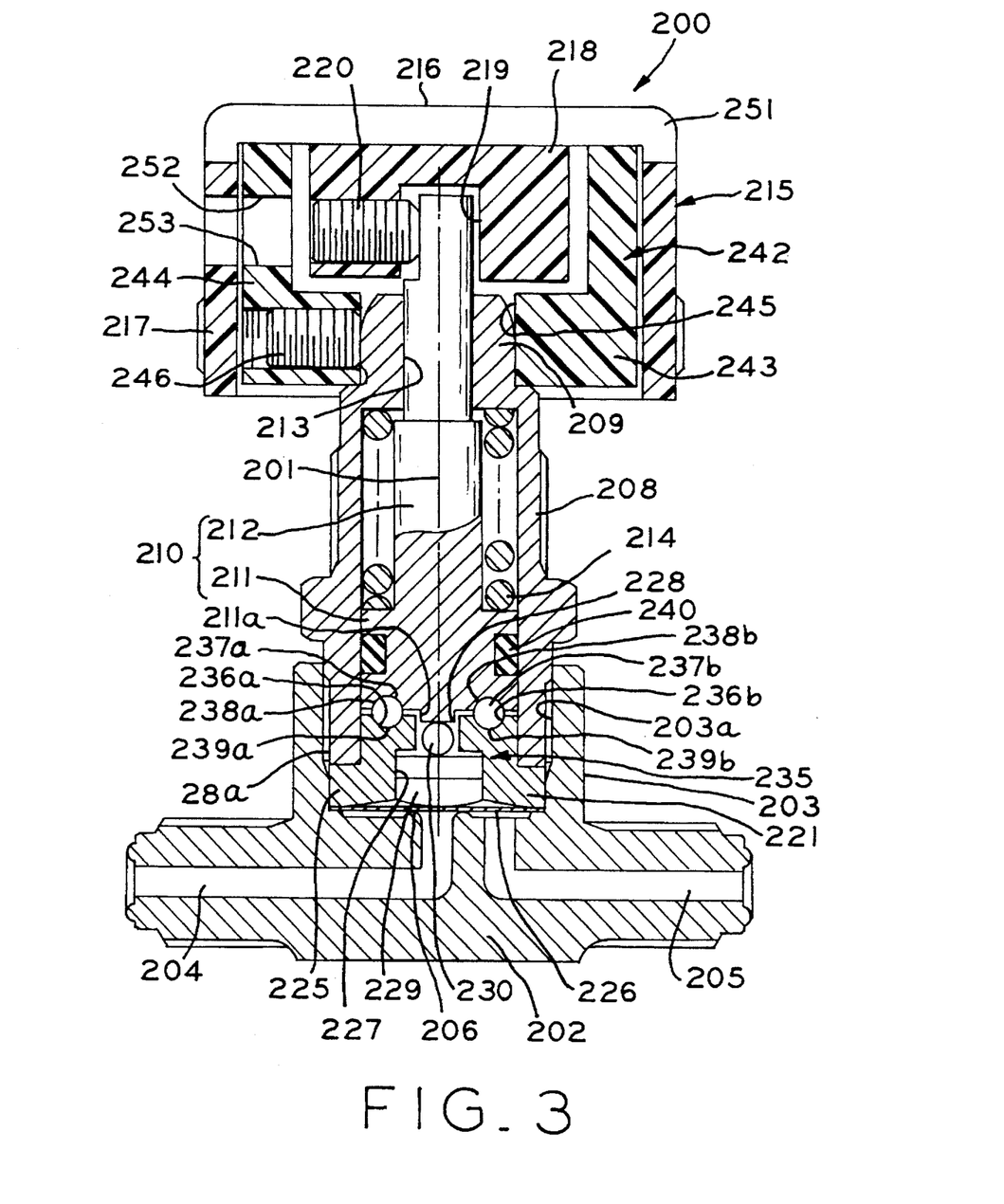
FIG. 3 is a cross sectional view of a metal diaphragm valve in an embodiment of the manual valve apparatus in accordance with the present invention.

Next, a First Embodiment of the manual valve apparatus in accordance with the present invention will be explained using FIGS. 3 through 9. FIG. 3 shows a manual metal diaphragm valve 200. This metal diaphragm valve 200 is provided with a valve casing 202. Valve casing 202 is unitarily provided with a coupling seat unit 203 which projects upwardly. The coupling seat unit 203 has a cylindrical shape, and the upper surface thereof is open. A female screw portion 203a is formed on the inner surface of this coupling seat unit 203.

An inlet path 204 and an outlet path 205 for gas are formed in the inner portion of valve casing 202. Inlet path 204 and outlet path 205 have openings in the bottom surface of coupling seat unit 203. The opened end of inlet path 204 is positioned in the central portion of the bottom surface of coupling seat unit 203, and an annular valve seat 206 is provided in a projecting manner in the periphery of this opened end.

A guide member 208 having a hollow cylindrical shape, termed a "bonnet", is attached to the coupling seat unit 203 of valve chamber 202. The guide member 208 is provided with a male screw portion 208a at the outer circumferential surface of one end thereof. Guide member 208 is affixed to valve casing 202 by screwing this male screw portion 208a into the female screw portion 203a of the coupling seat unit 203. In addition, a cylindrical boss 209 having a small diameter is formed unitarily at the end of guide member 208 which is opposite to that of male screw portion 208a.

A valve stem 210 is inserted in the interior of guide member 208. Valve stem 210 is provided with a large diameter portion 211 and a small diameter portion 212 which is coaxially connected with this large diameter portion 211. A valve seat 206 is positioned on the axis 201 of this valve stem 210. The large diameter portion 211 of the valve stem 210 is positioned on the side of valve casing 202. The outer circumferential surface of large diameter portion 211 is in contact with the inner circumferential surface of guide member 208 so as to be capable of sliding motion therealong. The lead end portion of small diameter portion 212 penetrates a through hole 213 which is opened in the boss 209 described above so as to be capable of sliding motion therein, and projects outward. For this reason, valve stem 210 is supported by guide member 208 at two portions, the large diameter portion 211 and the small diameter portion 212, and is capable of reciprocating motion in the axial direction with respect to guide member 208, and is freely rotatable about the axis.

A compression coil spring 214 is placed on the inner side of guide member 208 as a spring member. This compression coil spring 214 exerts a constant urging force to valve stem 210 in the direction of valve seat 206.

Figure 8:
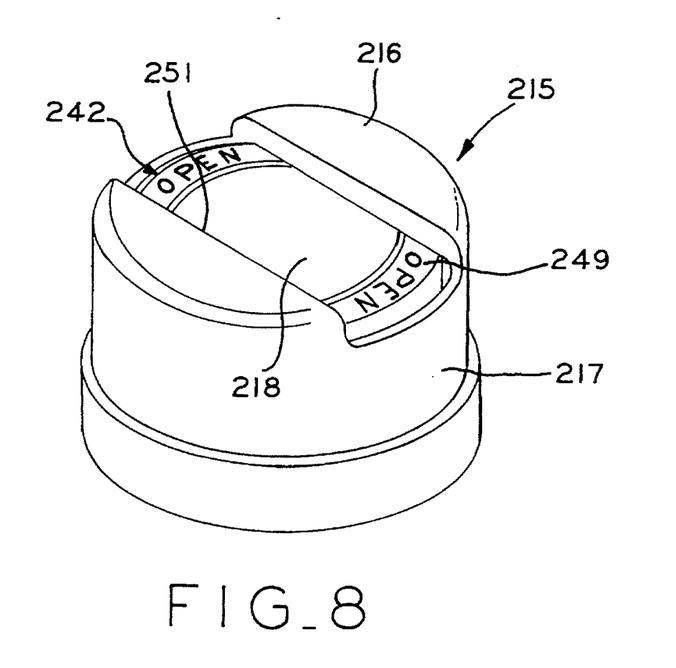
FIG. 8 is an angled view of the handle in an embodiment of the manual valve apparatus in accordance with the present invention.

An aluminum handle 215 is attached to the projecting end of the small diameter portion 212 of the valve stem 210. As shown in FIG. 8, the handle 215 has a cylindrical shape in which one end is closed, and furthermore, the handle 215 is provided with an end wall 216 which is positioned on the axis of the valve stem 210, and a cylindrical circumferential wall 217 which is connected to the periphery of this end wall 216. A coupling projection 218 is provided in a projecting manner at the central portion of the lower surface of end wall 216. Coupling projection 218 is provided with a coupling hole 219 which is opened in the central portion of the lower surface thereof. The projecting end of the small diameter portion 212 is inserted into this coupling hole 219, and furthermore, the removal of the projecting portion is prevented by means of the screw 220, and the projecting portion is thus fastened therein. By means of this fastening, the handle 215 and the valve stem 210 are joined so as to rotate unitarily.

A diaphragm presser 225 is interposed between the bottom surface of coupling seat unit 203 and guide member 208. Diaphragm presser 225 is provided with a flange portion 221 which is held between the bottom surface of the coupling seat unit 203 and one end surface of the guide member 208. A diaphragm 226 is disposed between the lower surface of the diaphragm presser 225 and the bottom surface of the coupling seat unit 203. Diaphragm 226 is held between the outer circumferential portion of the lower surface of the flange portion 221 and the bottom surface of the coupling seat unit 203, and by means of this, the central portion of the diaphragm 226 is capable of coming into contact with, or moving away from, valve seat 206. By means of this, in the case of the present embodiment, the diaphragm 226 functions as a valve which opens and closes inlet path 204.

A concavity 227 which opens downwardly and is in opposition to diaphragm 226 is formed in the central portion of the diaphragm presser 225. The concavity 227 has an opening in the upper surface of the diaphragm presser 225 via passage hole 228. A pressing element 229 is placed within this concavity 227 so as to be capable of sliding motion in the axial direction. The pressing element 229 is positioned on the axis 201 of the valve stem 210, and furthermore, the lower surface thereof, which is curved so as to be spherical, makes contact with the central portion of the upper surface of diaphragm 226.

The upper surface of diaphragm presser 225 is in the vicinity of the lower surface of the large diameter portion 211 of the valve stem 210. The pressing projection 211a at the center portion of the lower surface of this large diameter portion 211 enters into the passage hole 228. Furthermore, a linking ball 230 is placed within passage hole 228. Linking ball 230 is held between the pressing projection 211a of large diameter portion 211 and pressing element 229, and the spring force of the compression coil spring 214 is transmitted to pressing element 229 through linking ball 230.

Figure 4:
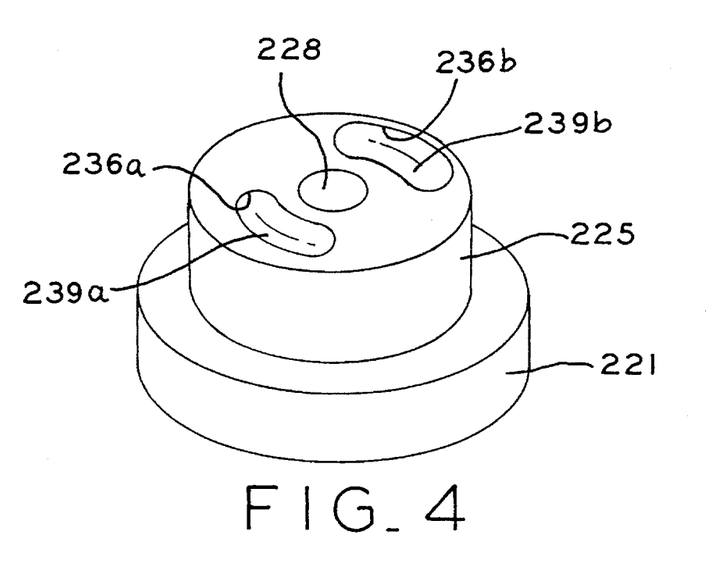
FIG. 4 is an angled view of the diaphragm presser in an embodiment of the manual valve apparatus in accordance with the present invention.

A conversion mechanism 235 for converting the rotation of valve stem 210 into reciprocating motion along the axial direction and transmitting this to pressing element 229 is interposed between the large diameter portion 211 of valve stem 210 and the diaphragm presser 225. Conversion mechanism 235 is provided with a pair of engaging grooves 236a and 236b which are formed in the upper surface of diaphragm presser 225 which serves as a base, and spherical rolling elements 237a and 237b, which are engaged in a freely rolling manner in the engaging grooves 236a and 236b. As shown in FIG. 4, engaging grooves 236a and 236b are formed at positions in mutual opposition in the diametrical direction of the diaphragm presser 225, and furthermore, the cross sectional shape thereof is hemispherical. In addition, engaging grooves 236a and 236b are curved so as to be arcuate in shape and center on the axis 201 of the valve stem 210, and are formed in the upper surface of the diaphragm presser 225 in a range of 90° with respect to the angle of rotation of the valve stem 210.

The rolling elements 237a and 237b described above are supported in a freely rolling manner in the support holes 238a and 238b in the lower surface of the large diameter portion 211. These rolling elements 237a and 237b rotate unitarily with valve stem 210. Accordingly, as a result of the engagement of the rolling elements 237a and 237b and the engaging grooves 236a and 236b, the rotational angle of the valve stem 210 is set to 90°. In the case of the present embodiment, when the rotational angle of the valve stem 210 is 0°, the valve stem 210 is in the closed position, and furthermore, when the rotational angle is 90°, the valve stem 210 is in the opened position.

Figure 5:
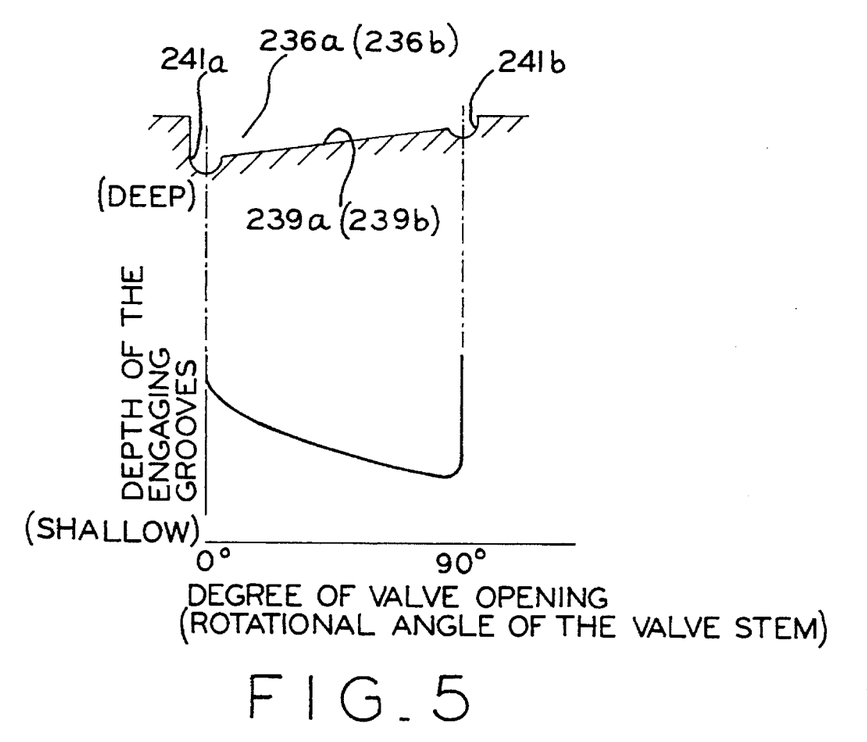
FIG. 5 shows the transition in the groove depth of the engaging grooves with respect to the rotational angle of the valve stem in an embodiment of the manual valve apparatus in accordance with the present invention.

As shown in FIG. 5, engaging grooves 236a and 236b are formed so as to slowly become shallower as progress is made from the closed position to the opened position. For this reason, the bottom surfaces of the engaging grooves 236a and 236b are formed as cam surfaces 239a and 239b, which are inclined upwards from the closed position in the direction of the opened position, and the rolling elements 237a and 237b roll along and maintain contact with the cam surfaces 239a and 239b.

For this reason, when the rotational angle of valve stem 210 is 0°, and the valve 210 is rotated to the closed position, the depth of the engaging grooves 236a and 236b reaches a maximum value. In the case, the rolling elements 237a and 237b enter deeply into the engaging grooves 236a and 236b, and the valve stem 210 is pressed downwards as a result of the urging force of compression coil spring 214. When this occurs, the projecting portion 211a on the lead end of the large diameter portion 211 enters into the passage hole 228, and the pressing element 229 is pressed downwards via linking ball 230, and as a result, the central portion of the diaphragm 226 is pressed against the valve seat 206 as a result of this pressing element 229, and the valve seat 206 is closed.

Furthermore, in the case in which the valve stem 210 is rotated to the opened position, the depth of the engaging grooves 236a and 236b become shallow. As a result, the rolling elements 237a and 237b project from the upper surface of the diaphragm presser 225 to a great extent, and the valve stem 210 is pushed upward against the urging force of the compression coil spring 214. In addition, by means of this, the pressure of the pressing element 219 is eliminated, the diaphragm 226 is affected by the fluid pressure flowing into the inlet path 204 and separates from the valve seat 206, and the valve seat 206 is opened. Accordingly, the lift characteristics of the valve stem 210, or the pressing element 229, are determined by means of the shape of cam surfaces 239a and 239b.

Furthermore, in the present embodiment, cavities 241a and 241b are formed at both ends of the cam surfaces 239a and 239b of the engaging grooves 236a and 236b. For this reason, engaging grooves 236a and 236b become deeper in the portion corresponding to the rotational angles of 0° and 90° of the valve stem 210. In addition, in the state in which the valve stem is rotated to the closed position or the opened position, the rolling elements 237a and 237b snap into the cavities 241a and 241b as a result of the urging force of the spring 214. An O-ring 240 is attached at the outer circumferential surface of the large diameter portion 211 so as to prevent the entry of the abraded material accompanying the sliding motion of the valve stem 210 into the engaging grooves 236a and 236b.

An indicator 242 which displays the rotational position of the valve stem 210 is attached to the boss 209 at the upper end of the guide member 208. The indicator 242 is provided with a disk-shaped base portion 243 and a cylindrical portion 244 which is connected to the peripheral portion of the base portion 243. The indicator 242 is fastened to the upper end of the guide member 208 so as to be rendered incapable of movement by means of engaging the engaging hole 245 in the center of the base portion 243 with the boss 209, or by means of attachment via a set screw 246.

Figure 6A:
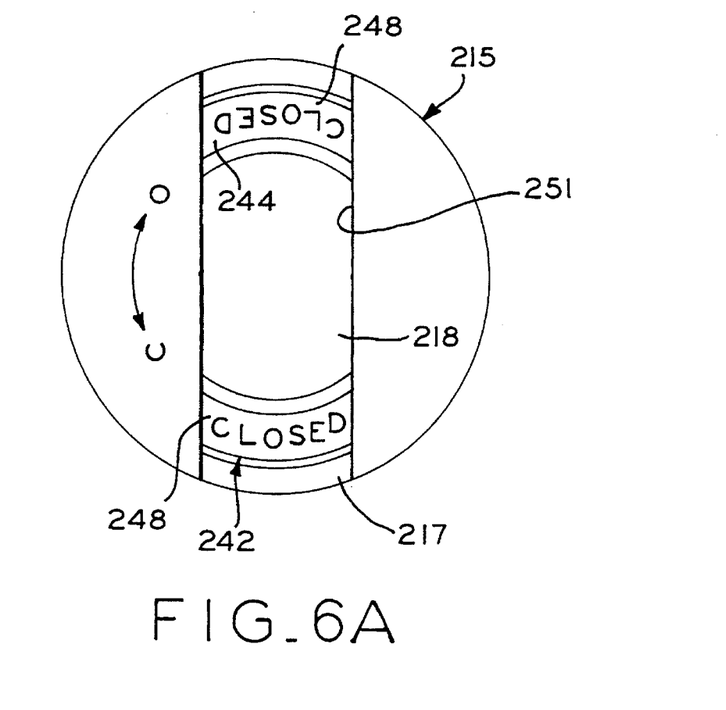
Figure 6B:
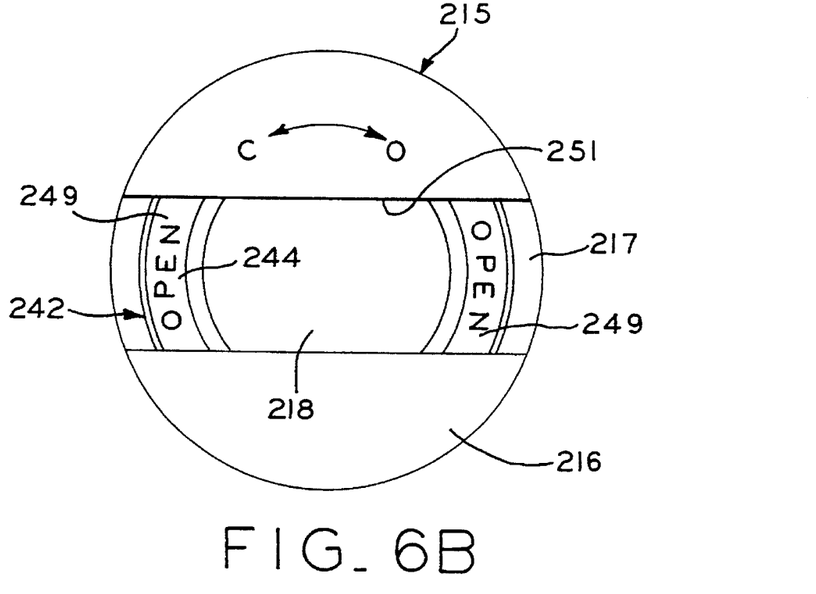

The indicator 242 is incorporated in the inner side of the handle 215 described above, and the cylindrical portion 244 thereof is interposed between the circumferential wall 217 of the handle 215 and the coupling projection 218. The upper end surface of the annular cylindrical portion 244 is in mutual opposition to the end wall 216 of the handle 215. As shown in FIG. 6, a first display portion 248, which conducts a "CLOSED" display indicating a state in which the valve stem 210 is rotated to the closed position, and a second display portion 249, which conducts an "OPEN" display indicating a state in which the valve stem 210 is rotated to the opened position, are respectively formed on the upper end surface thereof. As shown in FIG. 6(a), the "CLOSED" display in the first display portion 248 is provided at 2 positions which are in mutual opposition in the diametrical direction of indicator 242. Furthermore, as shown in FIG. 6(b), the "OPEN" display in the second display portion 249 is attached at 2 positions which are in mutual opposition in the diametrical direction of the indicator 242, so as to be perpendicular to the "CLOSED" display described above.

Accordingly, the "CLOSED" and "OPEN" displays are formed at angles of 90° in the circumferential direction in the upper end surface of the cylindrical portion 244. In the case of the present embodiment, the first and second opening indicate portions 248 and 249 on the upper end surface of the cylindrical portion 244 are colored with different colors than the end wall 216 and the circumferential wall 217 of the handle 215.

Figure 7:
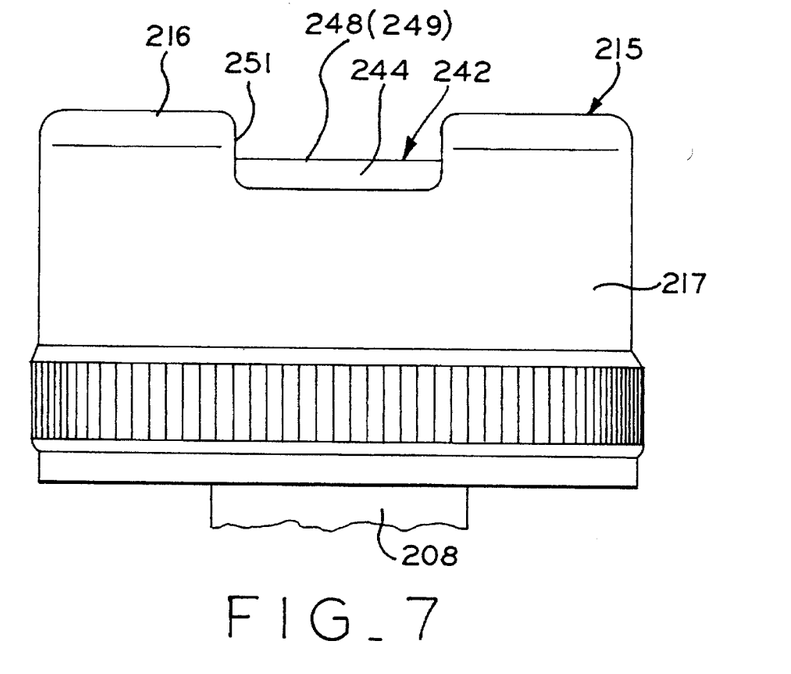
FIG. 7 is a side view of the handle in an embodiment of the manual valve apparatus in accordance with the present invention.

An elongated window 251 extending in the diametrical direction is opened in end wall 216 of handle 215. Both ends of window 251 are, as shown in FIGS. 3 and 7, open so as to be in contact with the circumferential wall 217 of the handle 215. One or the other of the first display portion 248 or the second opening indicate portion 249 of the indicator 242 is exposed via this window 251. Insertion holes 252 and 253 for the passage of the set screw 220 are provided in the circumferential wall 244 of the indicator 242.

In a metal diaphragm valve 200 having the composition described above, when the handle 215 is gripped and rotated, the rolling elements 237a and 237b, which rotate unitarily with valve stem 210, roll along cam surfaces 239a and 239b while maintaining contact therewith. For this reason, these rolling elements 237a and 237b move upwards or downwards with respect to the upper surface of the diaphragm presser 225 in accordance with the shape of the cam surfaces 239a and 239b. In addition, by means thereof, the valve stem 210 is caused to move reciprocally, and the diaphragm 226 is pressed into the valve seat 206, or moves away from valve seat 206.

In this manner, the engaging grooves 236a and 236b and the rolling elements 237a and 237b which serve to cause the reciprocating motion of the valve stem 210 are provided on the upper surface of the diaphragm presser 225 within the coupling seat unit 203, and furthermore, the bottom surface of the coupling seat unit 203 is in the vicinity of the valve seat 206. For this reason, undesirable variation in the positioning of the engaging grooves 236a and 236b or the rolling elements 237a and 237b with respect to the valve seat 206 is restricted, and special mechanisms for positional adjustment, such as those which were conventionally required, are unnecessary.

Furthermore, engaging grooves 236a and 236b and rolling elements 237a and 237b are positioned between the opposing surfaces of the valve stem 210 and the diaphragm presser 225, so that parts such as the ball bearings which projected from the circumference of the valve stem 210, as in the conventional conversion mechanism, are not present, and the conversion mechanism 235 can be made compact to that extent.

Accordingly, it is possible to place the conversion mechanism 235 within the coupling portion of the guide member 208 and the valve casing 202, and for this reason, the upper end portion of the guide member 208 does not become disproportionately large in comparison with the side of guide member 208 near valve chamber 202, and it is possible to form the metal diaphragm valve 200 compactly.

Furthermore, in this conversion mechanism 235, the rolling elements 237a and 237b roll along cam surfaces 239a and 239b of engaging grooves 236a and 236b while maintaining contact therewith, and thereby, the rotation of valve stem 210 is converted into reciprocating motion along the axial direction, so that by means of a simple composition in which only the angle of inclination of cam surfaces 239a and 239b is changed, it is possible to freely set the lift characteristics or the operational torque characteristics of valve stem 210 in accordance with the characteristics of diaphragm 226.

In addition, the conversion mechanism 235 is placed in the coupling portion between guide member 208 and valve casing 202, so that the space at the upper end portion of guide member 208 on the side of the handle 215 is freed, and it is possible to guarantee sufficient space for the installation of an indicator 242 which indicates the degree of opening of valve stem 210.

In this case, when handle 215 is rotated, the window 251 moves within an angular region of 90° about the axis of the valve stem 210, and either of the first opening indicate portion 248 or the second opening indicate portion 249 is exposed via this window 251. Here, the window 251 is opened not merely in the end wall 216 of the handle 215, but also is opened so as to connect to the circumferential wall 217 at both ends thereof. Accordingly, the "CLOSED" or "OPEN" display which is exposed in window portion 251 is not merely visible from above the metal diaphragm valve 200, but also from the side thereof.

In particular, in the present embodiment, the first and second opening indicate portions 248 and 249 are colored with a different color than that of handle 215, so that it is possible to distinguish this "CLOSED" or "OPEN" display on the basis of this difference in color as well. Accordingly, blind spots are eliminated in the display of the degree of opening of the valve, and the ease of use is improved.

Furthermore, cavities 241a and 241b are provided at both ends of cam surfaces 239a and 239b of engaging grooves 236a and 236b, so that when the valve stem 210 is rotated to the closed position or the open position, rolling elements 237a and 237b snap into the cavities 241a and 241b as a result of the urging force of spring 214, and furthermore, at this time, the rolling elements 237a and 237b collide with the cavities 241a and 241b. Accordingly, a metallic engaging sound is produced, and furthermore, the shock thereof is transmitted via valve stem 210 to handle 215, so that a sense of standardization is applied to the operations of this handle 215, and when the valve stem 210 is operated so as to reach the open position or the closed position, this can be confirmed in auditory and tactile manners. Accordingly, even in cases in which the indicator 242 is obstructed by the piping, or the indicator 242 is darkened and difficult to read, it is possible to easily confirm the completion of valve operations.

Figure 9:
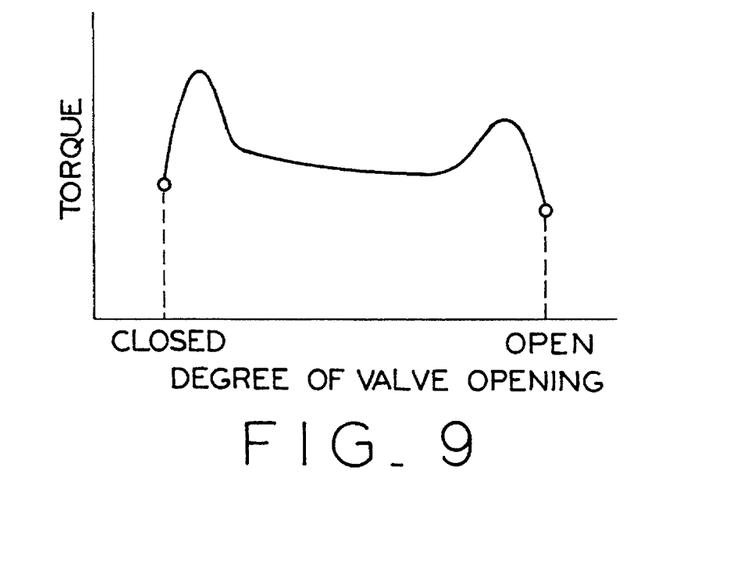
FIG. 9 is a characteristic diagram showing the transition of the torque during the rotation of the handle in an embodiment of the manual valve apparatus in accordance with the present invention.

Furthermore, as shown in FIG. 5, when the valve stem is rotated from the closed position to the open position, or in the reverse direction, the rolling elements 237a and 237b must ascend the stepped portion which is created between the cavities 241a and 241b and cam surfaces 239a and 239b. At this time, as shown in FIG. 9, it is necessary to apply a large rotational torque to the valve stem 210. Accordingly, even in cases in which the metal diaphragm valve 200 is operated under conditions in which vibration is applied thereto, the valve stem 210 or the handle 215 will not rotate in an undesirable manner, and it is possible to reliably maintain the open position or the closed position of the valve stem 210 or the diaphragm 226.

Figure 10:
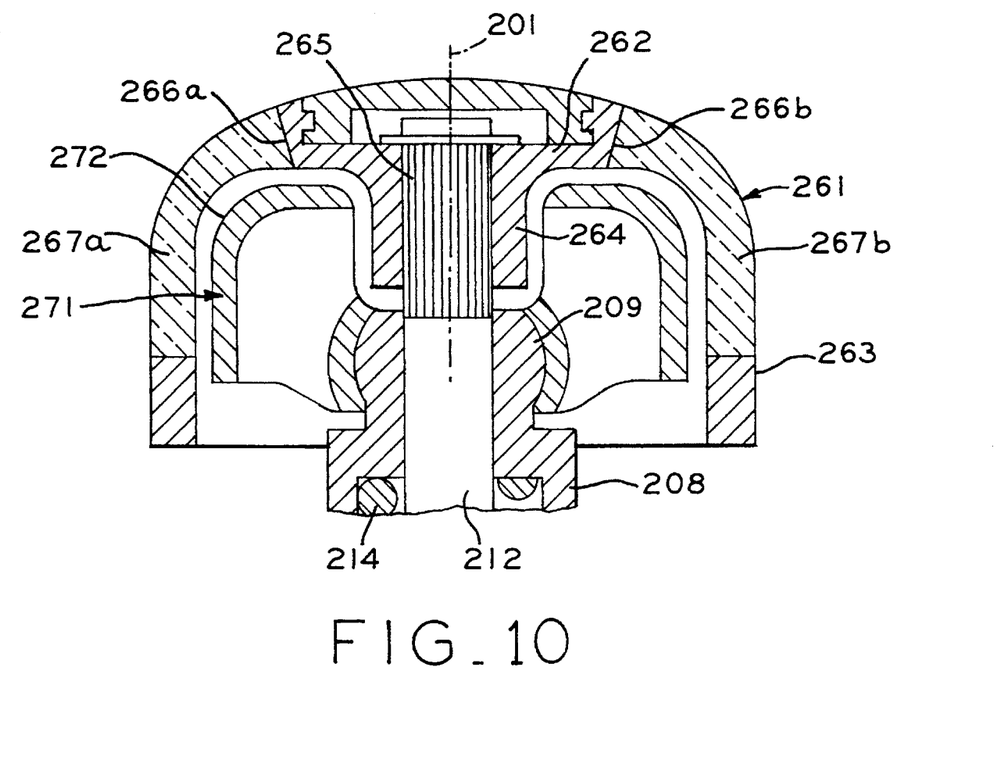
FIG. 10 is a cross sectional view showing the portions of the handle and the indicator which are attached in another embodiment of the manual valve apparatus in accordance with the present invention.

In FIG. 10, a Second Embodiment of the manual valve apparatus is shown. This Second Embodiment differs from the First Embodiment described above only in the structure of the handle 261 and the indicator 271 which is placed on the inner side thereof; all other details of the structure are identical to those of the First Embodiment described above.

As shown in FIG. 10, handle 261 is provided with an end wall 262 which is positioned on the axis 281 of valve stem 280, and a circumferential wall 263 which is connected to the periphery of the end wall 262; the handle has an overall cylindrical structure in which the bottom surface is opened. A boss 264 projects from the central portion of the lower surface of end wall 262, and the spline 265 of the upper end of the small diameter portion 282 engages in this boss 264. Accordingly, in this Second Embodiment, the handle 261 and the valve stem 280 are engaged by means of spline suspension so as to be capable of unitary rotation. In FIG. 10, reference numeral 284 indicates a compression coil spring.

In addition, windows 266a and 266b are open at two positions which are in mutual opposition in the diametrical direction of the peripheral wall 263. The upper ends of the windows 266a and 266b are open so as to connect to end wall 262. These windows 266a and 266b are covered with transparent covers 267a and 267b.

Indicator 271 has an annular shape, and the inner circumferential surface thereof is caulked to the boss 269 at the upper end of the guide member 268, and indicator 271 and handle 261 are capable of mutual rotation. This indicator 271 is provided with a display surface 272 which is in mutual opposition to the windows 266a and 266b of handle 261. In addition, as in the First Embodiment described above, "CLOSED" and "OPEN" displays are attached to the display surface 272. In addition, one or the other of the "CLOSED" or "OPEN" displays described above are exposed via windows 266a and 266b in accordance with the rotational position of handle 261.

In the Second Embodiment having this type of composition, the windows 266a and 266b which expose the "CLOSED" and "OPEN" displays are opened in a connected manner within an area from the circumferential wall 263 of handle 261 to the side wall 262 thereof. For this reason, the "CLOSED" and "OPEN" displays are visible not merely from above the metal diaphragm valve but from the side thereof as well.

In this Second Embodiment, the windows are provided at two positions on the handle; however, by, for example, providing a window at one position, and furthermore, by providing an indicating projection projecting sideways at the end which is on the diametrically opposite side of the handle from the window, it is possible to provide a structure in which the degree of opening of the valve can be determined from the position of the indicating projection even in cases in which the handle is viewed from the side on which the window is not present. Furthermore, the rolling elements which are engaged in the engaging grooves are not limited to balls; for example, cylindrical or conical rollers may be employed.

Furthermore, the manual valve apparatus in accordance with the present invention is not limited to a metal diaphragm valve; the apparatus may be executed in other types of valve apparatuses, such as, for example, a block valve or the like.

INDUSTRIAL APPLICABILITY

As described above, in accordance with the manual valve apparatus in accordance with the present invention, the conversion mechanism is in the vicinity of the valve seat, so that it is possible to greatly restrict the undesirable variation in the position thereof with respect to the valve seat, and for this reason, a special mechanism for positional adjustment is unnecessary. Furthermore, this conversion mechanism does not possess parts which project outwardly in a diametrical direction of the valve stem, so that the conversion mechanism itself can be made compact. For this reason, the conversion mechanism can be placed within the guide member, and a miniaturization of the valve apparatus as a whole becomes possible.

Furthermore, the conversion mechanism is in the vicinity of the valve seat, so that space is freed at the handle-side end of the guide member, and it is possible to guarantee space sufficient for the installation of an indicator indicating the degree of valve opening at this position. In addition, the opening display portion of this indicator is exposed in a continuous manner from the end surface of the handle to the circumferential surface thereof, so that the opening display portion is visible within a wide range around the handle. For this reason, blind spots are eliminated in the display of the degree of opening of the valve, and the ease of use is improved.

Furthermore, when the valve stem is rotated to the closed position or the open position, the rolling elements snap into the cavities as a result of the urging force of the spring. At this time, an engaging sound is generated when the rolling elements enter the cavities, and the shock thereof is transmitted to the handle through the valve stem, so that a sense of standardization is applied to the handle operations. For this reason, the movement of the valve to the open position or the closed position can be verified not merely visually, but also in an auditory and tactile manner. Accordingly, even in cases in which the indicator is obscured by piping, or the indicator is darkened and difficult to see, the completion of valve opening or closure can be confirmed. Moreover, when the valve stem is rotated from the closed position to the open position or in the reverse direction, the rolling elements must ascend a stepped portion formed between the cavities and the bottom surface of the grooves, axed furthermore, it is necessary to apply a large rotational torque to the handle at this time. Accordingly, even in cases in which the valve apparatus is used under conditions in which vibration is applied thereto, the valve stem or the handle will not rotate in an undesirable manner, and it is possible to reliably maintain the closed position or the open position of the valve.

What is claimed is:

1. A manual control valve apparatus, comprising:

a valve casing having a valve seat;

a tubular guide member coupled with said valve casing;

a valve stem supported by said guide member so as to be capable of reciprocating motion in one of a direction toward and a direction away from said valve seat, said valve stem supported so as to be capable of rotation about an axis, an end portion on the opposite side from said valve casing projecting outward from said guide member;

a valve interposed between said valve stem and said valve seat, said valve moving relative to said valve seat to one of coming into contact with and separating from said valve seat via said valve stem;

a spring member which urges said valve in a direction such that said valve is continuously pressed into said valve seat;

a handle which is coupled to an end of said valve stem and which projects outward and which moves said valve to one of contact with and away from said valve seat by rotating said valve stem;

a conversion mechanism for converting rotation of said valve stem into reciprocating motion in an axial direction interposed between said valve casing and said guide member, said conversion mechanism provided with a base possessing an opposing surface in mutual opposition with a lead end portion of said valve stem, engaging grooves which are formed in the opposing surface of said base and which are curved in an arcuate form having an axis of said valve stem as a center thereof, and rolling elements which are supported by a lead end surface of said valve stem and which are engaged in a freely rolling manner in said engaging grooves;

bottom surfaces of said engaging grooves inclined along a direction of said grooves, said bottom surfaces defining cam surfaces for causing reciprocating motion in the axial direction of said valve stem;

an indicator adjoining said handle provided with an opening display portion displaying a rotational position of said valve stem, said indicator attached at an end of said guide member opposite from said valve casing, said handle adjoining said indicator provided with a circumferential wall covering a circumferential surface of said indicator, and an end wall covering the opening display portion of said indicator and connected to said circumferential wall;

a window exposing said opening display portion provided in an area extending from said circumferential wall of said handle to said end wall; and cavities provided in said bottom surfaces of said engaging grooves, said rolling elements snapping into said cavities when said valve stem is rotated to one of a closed position and an open position.

* * * * *